United States Patent [19]

Dacey, Jr.

[11] Patent Number: 4,998,332
[45] Date of Patent: Mar. 12, 1991

[54] METHOD FOR BODY PANEL ATTACHMENT

[75] Inventor: Ernest A. Dacey, Jr., Highland, Mich.

[73] Assignee: Utica Enterprises, Inc., Sterling Heights, Mich.

[21] Appl. No.: 449,113

[22] Filed: Dec. 8, 1989

Related U.S. Application Data

[60] Continuation of Ser. No. 306,492, Feb. 6, 1989, abandoned, which is a division of Ser. No. 164,129, Mar. 4, 1988, abandoned.

[51] Int. Cl.$^5$ .................. B21C 37/30; B24B 39/00
[52] U.S. Cl. ...................................... 29/90.01; 29/525.1
[58] Field of Search .............. 29/90.01, 525.1; 72/71, 72/325; 403/406.1, 407.1; 408/223, 224, 225; 411/368, 369, 537

[56] References Cited

U.S. PATENT DOCUMENTS

| 3,382,630 | 5/1968 | Chivers | 411/537 X |
| 4,177,659 | 12/1979 | van Geffen | 72/71 |
| 4,185,486 | 1/1980 | van Geffen | 72/71 |
| 4,186,476 | 2/1980 | Mair et al. | 29/407 |
| 4,413,485 | 11/1983 | Larikka | 72/71 |

FOREIGN PATENT DOCUMENTS

1183683 3/1970 United Kingdom ............... 411/537

*Primary Examiner*—Timothy V. Eley
*Attorney, Agent, or Firm*—Remy J. VanOphem

[57] ABSTRACT

A method and apparatus for establishing a precisely predetermined location relative to a surface. A reforming tool has a main body, tapered portion, a shank and a tip having a point. The reforming tool is attached to a base having provision for rotating and reciprocating the reforming tool. According to the method of the present invention, the reforming tool is used to burnish an annular seat in a surface, an aperture coaxial with the annular seat, and an annular flange about the aperture. The location of the annular seat is precisely predetermined. The apparatus includes a button having a flat surface at one end and a part spherical surface at the other end that is received by the annular seat so that the part spherical surface rests on the annular seat. The button end having the flat surface then defines the precisely predetermined location, particularly an attachment location for a body panel onto a surface of a frame member. A threaded fastener then inserts through an aperture in the body panel an a central bore in the button, and screws into the annular flange, thereby securing the body panel to the frame member. When the frame member must be reformed at a plurality of locations, a plurality of reforming tools are used, each reforming tool being attached to a base at a predetermined location. Movement of the base relative to the inner body frame structure will thereupon cause each of the tools to burnish the surface of the frame member as hereinabove described.

14 Claims, 3 Drawing Sheets

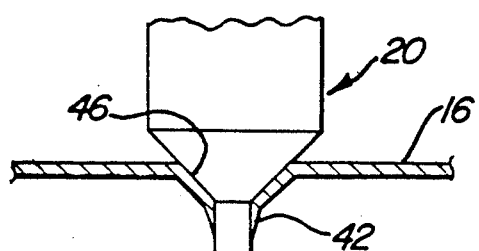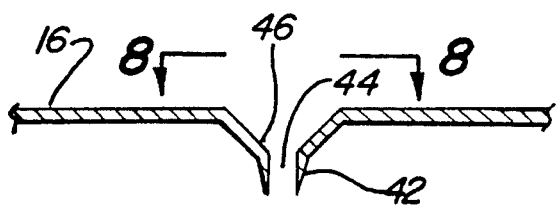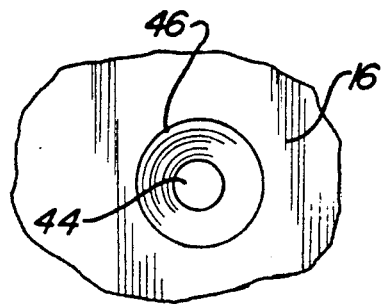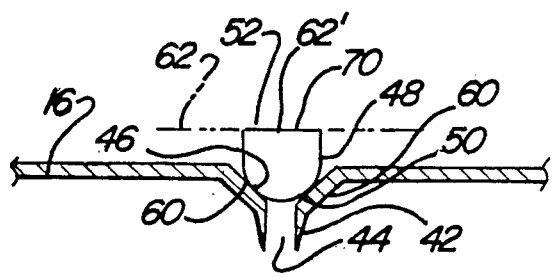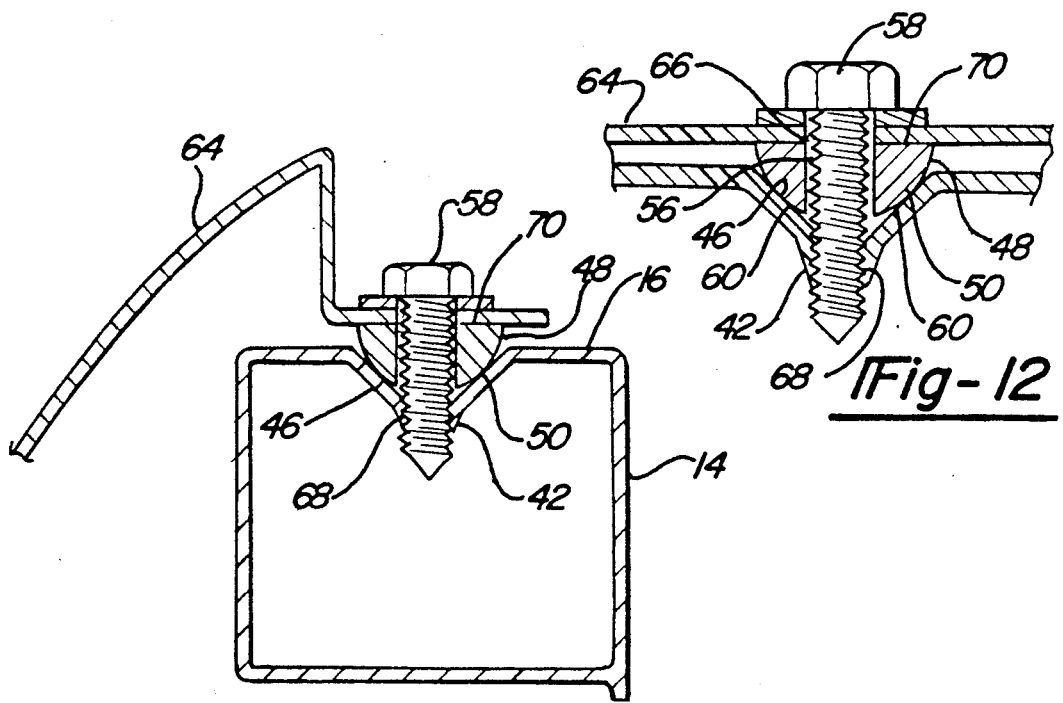

METHOD FOR BODY PANEL ATTACHMENT

This is a continuation of application Ser. No. 07/306,492, filed Feb. 6, 1989, now abandoned, which is a division of application Ser. No. 164,129, filed Mar. 4, 1988 now abandoned.

BACKGROUND OF THE INVENTION

1. FIELD OF THE INVENTION

This invention relates to the attachment at a precise position of a first member to a second member which is not as precisely positioned as the first member, and provides a method of and apparatus for locating the position of the first member and for reforming the second member by a variable magnitude depending on the actual position of the second member relative to a predetermined position. The invention relates, in particular, to the precise attachment of an outer body panel member of an automotive vehicle to an imprecisely located element of an inner body frame structure, particularly an inner body frame structure in which only one surface is accessible.

2. DESCRIPTION OF THE PRIOR ART

U.S. Pat. No. 4,438,971 to Zaydel et al, describes a method and an apparatus for attaching, at a precise location, a plastic automotive body panel to a relatively imprecisely located element of an inner body frame structure. According to the teachings of this patent, plastic filled metal attachment blocks or pads are welded at selected locations to the inner body panel structure. The inner body panel structure is then positioned within a locating and machining fixture and each of the plastic filled attachment blocks is milled to a precise location, the distance between the inner body frame structure and the milled face of the plastic filled attachment block varying with the position of the inner body frame structure. The plastic outer body panel member is then attached to the milled face of the plastic filled attachment block, after drilling a hole in the plastic filled attachment block to receive a threaded fastener or a fastener attached to the inside of the plastic outer body panel member. By this method and apparatus, each such plastic outer body panel member is mounted at a precisely determined location and in precise surface alignment with each adjacent plastic panel.

The method and apparatus of the aforesaid U.S. Pat. No. 4,438,971 does lead to precision in the locating of plastic outer panels to a relatively imprecisely positioned automotive inner body frame structure, but it requires the initial attachment of the plastic filled attachment block to the inner body frame structure, a factor which adds to the material and processing costs of producing an automotive body in this manner, and a welding operation that is needed to attach the plastic filled metal attachment block is noisy and dirty. Additionally, the subsequent milling of the plastic filled attachment blocks generates scrap having a composition containing a mixture of metal and a plastic filler material which, for the disposition of such scrap in an environmentally acceptable manner, involves additional expense. In any case, milling of the plastic filled attachment blocks generates dust corresponding, mainly, to the composition of the plastic filler which is objectionable on environmental and work place health and safety grounds, unless strict precautions are followed in performing the milling and drilling of the plastic filled attachment blocks.

It is also known in the prior art that a relatively imprecisely located automotive inner body frame element can be built up to provide for the attachment thereto of an outer body element at a more precisely determined location by attaching one or more metal shims to the surface of the inner body frame element to which the outer body panel element is to be attached. The number of such shims to be attached is based upon the original position of the inner body frame element. However, this is a time consuming and expensive procedure, as each shim must be individually sized and positioned and the attachment of such shims adds to the weight of the vehicle, an undesirable feature since it detracts from fuel economy. An example of a shim system which addresses these problems is U.S. Pat. No. 4,437,784 to Peterson which discloses a collapsible metal shim member that allows a surface of the shim to be spaced a predetermined distance from a support member to which it is attached. These shims must be preattached to the frame and their collapsibility limits their inherent strength and stability.

It is additionally known in the prior art to provide a shank having a tapered tip which is able to pierce a sheet material, thereby producing flared ridges of the sheet material around the periphery of the hole thereby produced. U.S. Pat. No. 4,068,554 to Hirabayashi is an example of such a device. The device is composed of a shank and a tip, wherein the tip is further composed of a point and a base portion. The point has a pair of pyramidally shaped, regularly polygonal cross-sections and has a certain number of edges extending divergently at an obtuse angle from the base portion. The base portion has a smaller number of rounded ridges relative to the number of edges in the point. Each of the rounded ridges has a curved outer surface, becoming wider as they approach the shank. In operation, the point of the device pierces the sheet material, and as the device further penetrates into the sheet material, the sheet material is caused to flare on the opposite surface from that of entry of the device.

Devices such as these are used to provide a flaring of the sheet material, as well as a hole therethrough, so that the threads of a threaded fastener will have an adequate anchorage in relation to the sheet material. However, these devices fail to adjust for variations in the precise position of the sheet material, as all that is provided thereby is a hole for fastening a threaded fastener thereinto without any accommodation for variation in surface position of the sheet material. Thus, while such devices provide for reliable and inexpensive attachment between elements, there is no provision for precisely adjusting the relative position between the elements.

An apparatus and method for reforming the surface of an inner body frame member to provide precise location of the attachment point of an outer body panel thereto is described in my co-pending patent application, Ser. No. 810,045, filed Sept. 17, 1985 now U.S. Pat. No. 4,760,633. Therein is disclosed an apparatus including a movable ram, floating support attachments and fixed anvils. The movable ram is located on one side of the inner body frame member, while the fixed anvils are located on the other side thereof. The movable ram is movable toward and away from the aforesaid side of the inner body frame element. The movable ram has associated pad forming blocks which contact the surfaces of the inner body frame members on the opposite side of the fixed anvils. After the floating support attachments have been brought into contact with the surface of the inner body frame member that is to be reformed and have been locked in position, the movable ram is actuated to move toward the inner body frame member and reform the portions thereof that are trapped between the fixed anvils and the pad forming blocks. Thus, the inner body frame member will be provided with one or more pads, the outside surface of each of which corresponds in position to the fixed position of the fixed anvil against which it is formed, regardless of the original position of the inner body frame member from which it is formed. The depth of each of such pads varies, therefore, according to the difference between the fixed position of its outer surface and the original position of the portion of the outer surface of the inner body frame member from which it is formed. Each of the aforesaid pads is ready for the attachment of an outer body panel member thereto without any further machining or any other processing being required to establish its fixed location. The only additional processing normally required is the lancing, punching or piercing of an aperture in such pad to receive a fastener for the fastening of the outer panel element thereto which, if desired, is most conveniently performed during the forming of the pad by a tool which reciprocates within the fixed anvils. While the aforesaid method and apparatus is very satisfactory for inner body frame structures having surfaces accessible on both sides, it is not suitable for inner body frame structures having tubular or channel structures in which the opposite side surface is inaccessible.

Accordingly, there remains in the art the need to provide a method and apparatus for reforming a first element so as to precisely position a second element thereto, where the first element has only one side which is accessible, and further where the reforming of the first element is inexpensive, environmentally safe and simple to accomplish.

SUMMARY OF THE INVENTION

The present invention provides a method and an apparatus for establishing a precisely predetermined location on a frame member. The frame member most commonly has a tubular or channel shape having an adjacent surface which faces the attachment location for the panel member as well as a remote surface facing away from the aforesaid attachment location. Accordingly, the present invention provides for reforming the surface of the frame member which is adjacent the attachment location, while not reforming the surface remote from the attachment location.

The apparatus according to the preferred embodiment includes a reforming tool having a main body of generally cylindrical shape, a tapered portion of conical shape, a shank of cylindrical shape and a tip having a plurality of ridges which terminates in a point. The reforming tool is attached to a base having a rotary mechanism and a reciprocating mechanism for respectively rotatably and reciprocably moving the reforming tool.

According to the method of the present invention, the reforming tool is brought into contact with the surface of the frame member by a reciprocating mechanism in the base. The rotary mechanism rotates the point, while the reciprocating mechanism exerts axial force, allowing penetration of the point into the surface. A burnishing action caused by the ridges of the tip of the reforming tool causes the metal of the frame member to flare, resulting in an annular flange around the aperture formed by the penetration of the shank into the surface. Burnishing of the surface due to contact with the tapered portion of the reforming tool results in the surface being reformed into an annular seat having a shape complementary to that of the tapered surface of the reforming tool. The depth of the annular seat in relation to the surface of the frame is precisely predetermined by how far into the surface the reforming tool penetrates. A button having a central bore, one flat end and one part spherically shaped end is received by the annular seat so that the part spherically shaped end mates with the annular seat. The flat end surface of the button then defines a precisely predetermined location for attaching a body panel to the frame member. The body panel is attached by use of a threaded fastener that screws into the annular flange.

When the frame member must be reformed at a plurality of locations, a plurality of reforming tools are used, each reforming tool being attached to a base at a predetermined location. Movement of the base relative to the body frame structure will thereupon cause the reforming tools to burnish the frame member as hereinabove described, each resulting in an annular seat having a predetermined location. Identical buttons are inserted into the resulting annular seats to provide a plurality of precisely predetermined attachment points for the body panel relative to the frame member. The buttons may or may not have been preattached to the panel member.

BRIEF DESCRIPTION OF THE DRAWINGS

FIGS. 4 through 6 are part sectional side views showing the reforming tool in various stages of penetration into a body frame surface according to the present invention;

FIG. 7 is a sectional side view of the reformed surface of a body frame—according to the present invention;

FIG. 8 is a plan view of the reformed surface along lines 8—8 in FIG. 7;

FIG. 11 is a part sectional side view showing the reformed surface of FIG. 7, including the button of FIGS. 9 and 10 received therein;

FIG. 12 is a part sectional side view of a body panel mounted to a frame member according to the present invention;

FIG. 13 is a part sectional side view of the automotive frame structure along lines 13—13 of FIG. 1 now with a body panel mounted thereto according to the present invention;

DETAILED DESCRIPTION OF THE PREFERRED EMBODIMENT

Figure 1:
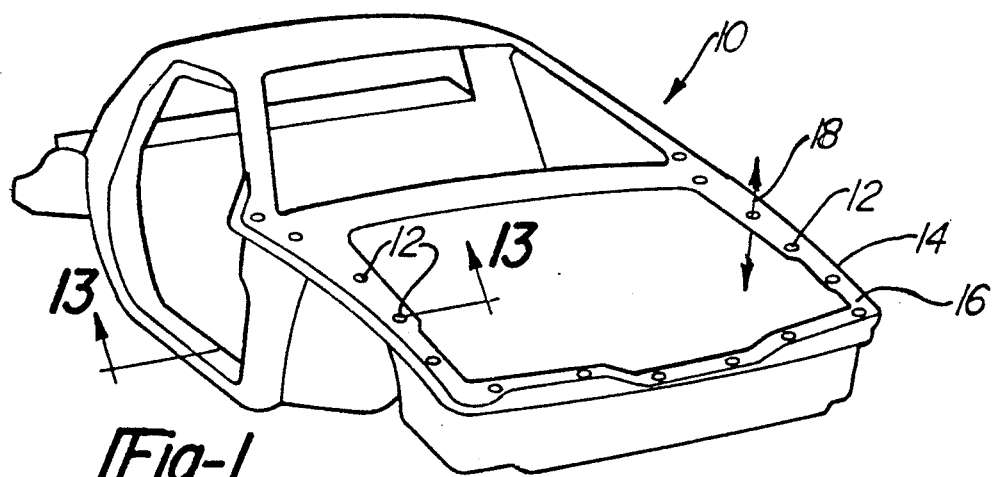
FIG. 1 is a perspective view of an automotive frame structure on which the present invention is utilized.

Referring now to the figures, FIG. 1 shows an automotive frame structure 10 before mounting of body panels thereonto. The body panels will be attached at locations 12 along a frame member 14. Frequently, in the manufacture of the frame structure, small variations in a frame member surface 16 along an axis 18 which is perpendicular thereto, will occur. These variations prevent the attachment locations 12 from being positioned at a predetermined location. When a body panel is attached to the frame structure surface, these variations in position can adversely affect the fit and look of the body panel. According to the present invention, a reforming tool 20 is provided which reforms the attachment locations to a predetermined position independent of manufacturing variations in the frame member 14. The apparatus of the present invention includes a reforming tool, a base 26 for reciprocating and rotating the reforming tool, and a button receivable into an annular seat formed in a surface by action of the reforming tool. The combination of the reforming tool, the base and the button forms a system for establishing a predetermined location relative to the surface, as hereinabove described.

Figure 3:
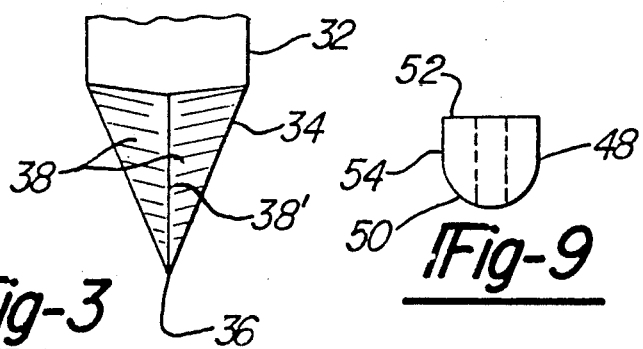
FIG. 3 is a detailed side view of the tip of the reforming tool according to the present invention.
Figure 9:
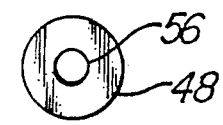
FIG. 9 is a side view of a button according to the present invention.
Figure 10:
FIG. 10 is a plan view of the button in FIG. 9.
Figure 2:
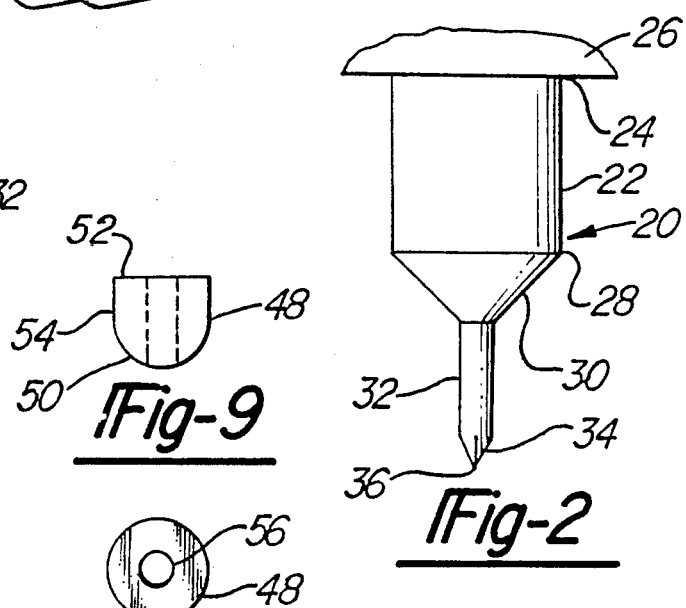
FIG. 2 is a side view of the reforming tool according to the present invention.

Referring to FIG. 2, the reforming tool 20 has a main body 22 having a generally cylindrical shape which attaches at an upper end 24 to the base 26. The base includes a rotary mechanism (not shown) for rotating the reforming tool by a device commonly known in the art, such as a drill mechanism. Further, the base includes a reciprocating mechanism (not shown) for precisely moving the reforming tool in reciprocable fashion by a device commonly known in the art, such as a drill press mechanism. A lower end 28 of the reforming tool is integral with a tapered portion 30, which tapers to a shank 32 having a smaller diameter than that of the main body 22. The tapered portion 30 preferably has a conical shape, but it also may have other shapes including a convex shape. The shank 32 is of cylindrical cross-section and ends in a tip 34 which tapers to a point 36. The tip includes a plurality of flat cuts 38 which form ridges 38'. It is preferred that all surfaces of the reforming tool are structured for burnishing rather than cutting or drilling, as will be explained hereinbelow. The structure of the tip, which is preferred to be of 3, 4, 5 or 6 ridges, is more particularly shown in FIG. 3.

FIGS. 4 through 13 show the reforming tool being utilized to reform the frame member so that a body panel may be attached thereonto at a precise predetermined location relative thereto.

Figure 4:
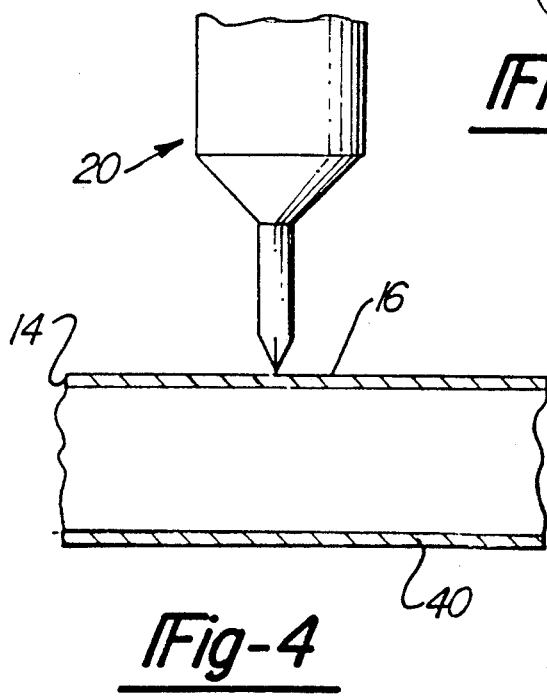

FIG. 4 shows the reforming tool 20 about to penetrate into the frame member 14 as the aforesaid reciprocating mechanism brings the reforming tool toward the frame member The aforesaid rotary mechanism is operative to cause rotation of the reforming tool 20. The frame member has a tubular or channel structure which prevents access to its opposite side surface 40. The frame member 14 may be constructed of steel, aluminum or other suitable structural materials.

Figure 5:
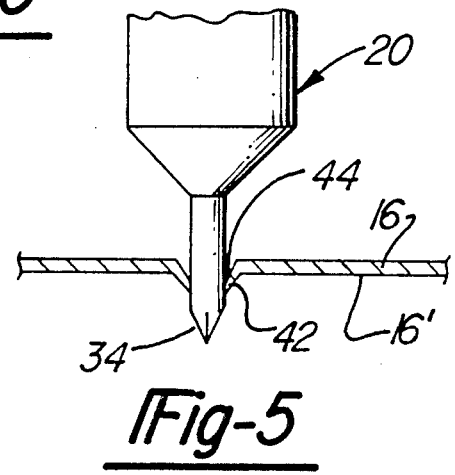

FIG. 5 shows the reforming tool after the tip 34 has penetrated into the frame member 14. As the reforming tool rotates and makes contact with the frame member, the tip causes an axial force in the frame member surface 16. This force allows the tip 34 to pierce through the frame member surface 16. The ridges 38' on the rotating tip 34 burnish the frame member surface 16 by the force of the movement of the reforming tool in relation to the frame member. This burnishing action causes the surface to flare, resulting in an annular flange 42 around an aperture 44 created by the penetration of the tip 34. During this process virtually little or no metal was removed from the surface of the frame member. For proper operation, the shank should preferably have a length at least as long as the length of the annular flange, as measured from an inner frame member surface 16'.

FIG. 6 shows the reforming tool after the tapered portion 30 has in part penetrated the frame member surface 16. The depth of penetration of the tapered portion into the frame member surface 16 is predetermined and controlled by movement of the reciprocating mechanism in the base 26. As the tapered portion 30 penetrates the frame member surface 16, it effects to burnish the aperture into a corresponding shape to that of the tapered portion. The size and depth of a resulting annular seat 46 is dependent upon the distance to which the tapered portion, owing to its tapered shape, penetrates into the frame member surface 16.

FIG. 7 shows the reformed surface of the frame member 14, which now includes the annular seat 46, the aperture 44 and the annular flange 42. FIG. 8 shows a plan view of the reformed surface of the frame member.

In order that a body panel may be attached to the frame member 14 at a precisely predetermined location, a button 48 is provided which fits into the annular seat 46 and provides a precise definition of the predetermined location of attachment. By reference to FIGS. 9 and 10 it can be seen that the button 48 has a generally cylindrical shape, one end 50 of which is part spherically shaped and the opposite end 52 of which is flat. The two ends 50 and 52 are separated by a precisely predetermined length of sidewall 54. The diameter of the button, which also defines the diameter of the part spherically shaped end, is also precisely predetermined. A central bore 56 is provided within the button for receiving a fastener 58, as will be explained hereinbelow. The part spherically shaped end of the button 48 is received by the annular seat 46, as shown in FIG. 11. The button will now contact the annular seat along an annular contact surface 60. Because of the precise depth to which the reforming tool penetrated the frame member surface 16, coupled with the precise dimensioning of the button 48 and the annular seat 46, the flat end 52 of the button now defines a plane 62 on which the precisely predetermined location for an attachment point 62' of the body panel to the frame member 14 is located.

FIG. 12 shows a body panel 64 mounted to the frame member utilizing the button 48. The fastener 58 passes through an aperture 66 in the body panel 64 through the central bore 56 in the button 48 and finally into the aperture 44 by engaging threads 68 with the annular flange 42. The aperture 44 defined the precise location of the attachment location in the plane of the frame member surface 16 of the frame member 14, while the annular seat 46 in combination with the button 48 define the precise location of the attachment point perpendicular to the frame member surface 16. Thus, what has been obtained by the present invention is a precise six way location of the attachment point 62' of the body panel to the frame member. In addition, the flat surface of the end 52 of the button 48 defines an attachment surface 70 for the body panel in the plane of the body panel at the attachment point.

FIG. 13 shows how the frame member's surface, reformed by creation of the annular seat 46, the aperture 44 and the annular flange 42, in cooperation with the button 48, permit the body panel 64 to be precisely mounted to the automobile frame structure 10.

Figure 14:
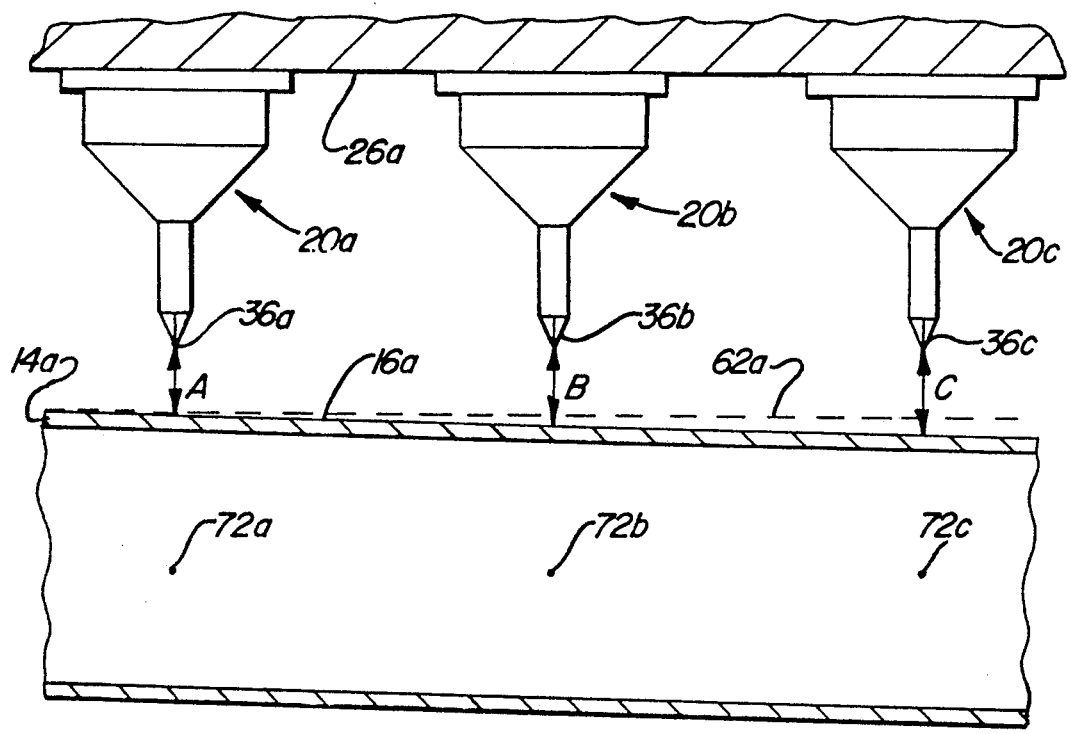
FIG. 14 is a part sectional side view of a plurality of reforming tools according to the present invention, mounted above a surface to be reformed.
Figure 15:
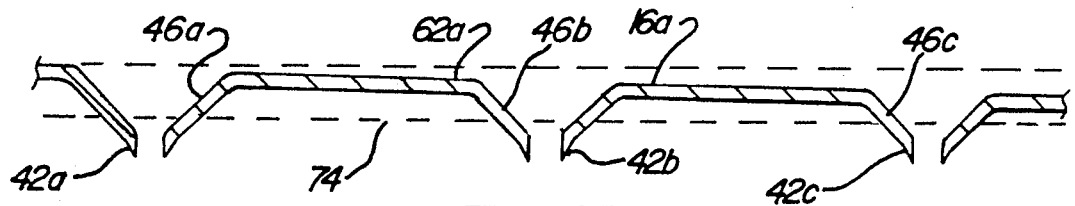
FIG. 15 is sectional side view of the surface shown in FIG. 14 after reforming according to the present invention.
Figure 16:
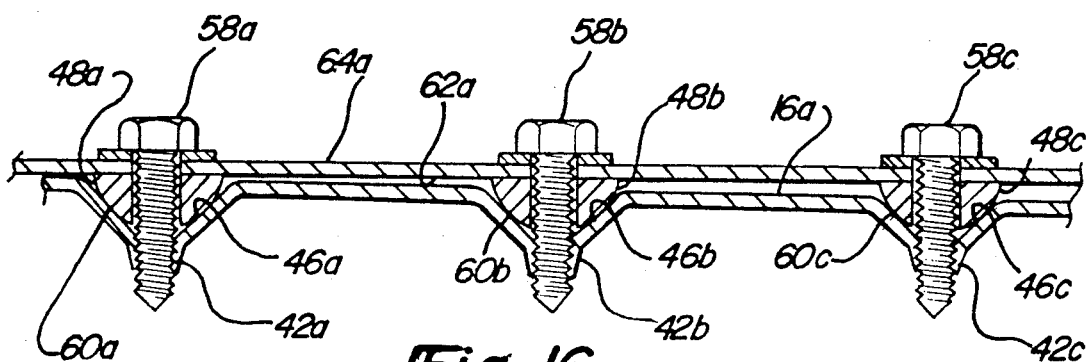
FIG. 16 is a part sectional side view of a panel member mounted to a frame member according to the present invention.

FIGS. 14 through 16 show how the present invention is used to reform a frame 14a simultaneously at a plurality of attachment locations. This is achieved by using a plurality of reforming tools, shown in FIG. 14 as 20a, 20b and 20c which are each attached to a base 26a in the manner hereinabove described for the reforming tool 20 and its associated base 26. Each of the reforming tools 20a, 20b and 20c has a construction identical with that hereinabove described for the reforming tool 20. As can be seen from FIG. 14, a surface 16a of the frame member 14a is not quite aligned parallel with the base 26a. The location of points 36a, 36b and 36c, however, is parallel with a reference surface, such as plane 62a, on which the predetermined attachment points for a body panel 64a are located. As a consequence, the points 36a, 36b and 36c of the reforming tools 20a, 20b and 20c, respectively, all lie equal distances from the plane 62a but are progressively farther from the surface 16a, as defined by lengths A, B and C, respectively. When the base 26a descends toward the surface 16a, the reforming tool 20a will strike the surface 16a first, followed successively by the reforming tools 20b and 20c. The reciprocating mechanism in the base causes the reforming tools to uniformly descend so that their tips reach predetermined locations 72a, 72b and 72c, respectively. Accordingly, at the end of this step, the reforming tools 20c, 20b and 20a will have penetrated successively more deeply into the surface 16a.

FIG. 15 shows the surface 16a after the reforming tools have been removed. It will seen that annular seats 46a, 46b and 46c formed, respectively, by the reforming tools 20a, 20b and 20c, are progressively deeper in the surface 16a. An annular flange 42a, 42b and 42c surrounds each of the annular seats, respectively. It will seen from the figure that each of the annular seats is located at a predetermined distance into the surface 16a so that they align along a plane 74 which is parallel to the reference surface defined by plane 62a.

FIG. 16 shows identical buttons 48a, 48b and 48c, respectively, in the annular seats 46a, 46b and 46c. The body panel 64a has been fastened to the frame member 14a in the plane 62a by fasteners 58a, 58b and 58c. The frame member 14a is located on the plane 62a because each of the buttons contact its respective annular seat on an annular contact surface 60a, 60b and 60c, respectively, that is located in the plane 74, and each of the buttons 48a, 48b and 48c are identical to each other.

In the preferred embodiment, the buttons are each identical and attached to the body panel at each attachment location. Further, all reforming operations are performed simultaneously after the automobile body has been aligned with the reforming tools. Additionally, the reciprocating mechanism may be adjusted so that each reforming tool will penetrate the surface of the frame member farther than that disclosed hereinabove to allow for springback of the burnished surfaces when the reforming tool is removed by action of the reciprocating mechanism. Finally, while the preferred embodiment has been directed to reforming a surface of a frame member of tubular or channel construction, the method and apparatus of the present invention is not limited to such structures and may include simply connected structures, such as metal sheet.

To those skilled in the art to which this invention appertains, the above described preferred embodiments may be subject to change or modification. Such changes or modifications can be carried out without departing from the scope of the invention, which is intended to be limited only by the scope of the appended claims.

What is claimed is:

1. A method for forming at least one annular seat in a surface of a member at a predetermined distance from a reference surface, comprising the steps of:
   burnishing at least one aperture in said surface of said member such that said surface is caused to flare and form an annular flange around said at least one aperture; and
   further burnishing said surface to produce said at least one annular seat coaxial with said at least one aperture, said at least one annular seat being burnished into said surface to a depth such that said at least one annular seat is spaced said predetermined distance from said reference surface independent of the distance of said surface of said member from said reference surface.

2. The method of claim 1, further comprising the steps of:
   providing at least one button having a part spherical surface at one end and a flat surface at the other end; and
   placing said at least one button on said at least one annular seat with said part spherical surface of said at least one button adjacent to said at least one annular seat, said flat surface of said at least one button establishing an attachment point displaced from said at least one annular seat.

3. The method of claim 1, wherein said step of burnishing comprises the step of burnishing a plurality of apertures, and further wherein said step of further burnishing comprises the step of further burnishing to produce a plurality of annular seats, each annular seat of said plurality of annular seats being burnished into said surface to a depth such that each said annular seat of said plurality of annular seats is spaced a predetermined distance from said reference surface.

4. The method of claim 3, further comprising the steps of:
   providing a plurality of buttons, each button of said plurality of buttons having a part spherical surface at one end and a flat surface at the other end; and
   placing one button of said plurality of buttons on each annular seat of said plurality of annular seats with said part spherical surface of each said button facing its associated annular seat, an attachment surface displaced from said annular seats by said predetermined distance being established by said flat surfaces of each of said plurality of buttons, respectively.

5. The method of claim 4, wherein all of said buttons of said plurality of buttons are identical to each other.

6. The method of claim 5, wherein said plurality of annular seats respectively define a plane.

7. The method of claim 1 wherein said step of burnishing an annular seat burnishes an annular seat having a conical shape.

8. A method for establishing at least one predetermined location relative to a reference surface comprising the steps of:
   burnishing at least one aperture in a surface of a member such that said surface is caused to flare and form an annular flange around said at least one aperture;

further burnishing at least one annular seat in said surface coaxially with said at least one aperture, said at least one annular seat being burnished into said surface to a depth sufficient to cause said at least one annular seat to be located a predetermined distance from said reference surface, the location of said at least one annular seat being independent of the distance of said surface of said member from said reference surface;

providing at least one button having a part spherical surface at one end and a flat surface at the other end; and placing said at least one button in said at least one annular seat with said part spherical surface of said at least one button adjacent to said at least one annular seat, said flat surface of said at least one button establishing said at least one predetermined location.

9. The method of claim 8 wherein said step of burnishing at least one annular seat burnishes an annular seat having a conical seat.

10. A method for establishing a predetermined location in the surface of a member at a predetermined distance from a reference surface independent of the actual location of said surface of said member relative to said reference surface comprising the steps of:

locating said member relative to said reference surface; and advancing a reforming tool from said reference surface to burnish a seat into said surface of said member to a depth sufficient to cause said seat to be formed in said surface at a distance equal to said predetermined distance independent of said actual location of said surface of said member relative to said reference surface.

11. The method of claim 10 wherein said reforming tool has a shank portion having a pointed tip and tapered portion for forming said seat, said step of advancing includes the steps of advancing said reforming tool to first burnish said surface with said shank portion to form an aperture through said surface then advancing said reforming tool to form said seat with said tapered portion of said reforming tool.

12. The method of claim 11 further comprising the step of placing a button in said seat to establish a second location displaced a fixed distance from said predetermined location.

13. The method of claim 12 wherein said reference surface comprises at least two attachment points, said step of locating said member locates said member relative to said at least two attachment points, and wherein said step of advancing a reforming tool advances a reforming tool from each of said at least two attachment points to form at least two seats in said surface, each of said two seats being burnished to a depth sufficient to form said at least two seats at said predetermined distance from its associated attachment point.

14. The method of claim 13 further comprising the step of placing a button in each of said at least two seats, the surfaces of said buttons opposite said at least two seats defining a second predetermined location displaced a fixed distance from said predetermined location.

* * * * *

UNITED STATES PATENT AND TRADEMARK OFFICE
CERTIFICATE OF CORRECTION

PATENT NO. : 4,998,332

DATED : March 12, 1991

INVENTOR(S) : Ernest A. Dacey, Jr.

It is certified that error appears in the above-identified patent and that said Letters Patent is hereby corrected as shown below:

In the Abstract

Line 3, before "tapered" insert ---- a ----.

Line 19, delete "an" and insert ---- and ----.

UNITED STATES PATENT AND TRADEMARK OFFICE
CERTIFICATE OF CORRECTION

PATENT NO. : 4,998,332
DATED : March 12, 1991
INVENTOR(S) : Ernest A. Dacey, Jr.

It is certified that error appears in the above-identified patent and that said Letters Patent is hereby corrected as shown below:

Column 1, line 37, delete "innel" and insert ---- inner ----.

Column 2, line 58, delete "Sept." and insert ---- Dec. ----.

Column 4, line 44, delete "frame-according" and insert ---- frame according ----.

Column 5, line 55, after "member" insert a period ---- . ----.

Column 6, line 55, delete "defined" and insert ---- defines ----.

Column 7, line 41, after "by" insert ---- the ----.

Signed and Sealed this

Twenty-first Day of July, 1992

Attest:

DOUGLAS B. COMER

*Attesting Officer*   *Acting Commissioner of Patents and Trademarks*